J. A. SEXAUER.
DOUGH MOLDING MACHINE.
APPLICATION FILED FEB. 9, 1921.

1,430,265.

Patented Sept. 26, 1922.
7 SHEETS—SHEET 1.

Inventor
John A. Sexauer.
By E. E. Vrooman & Co
his Attorneys

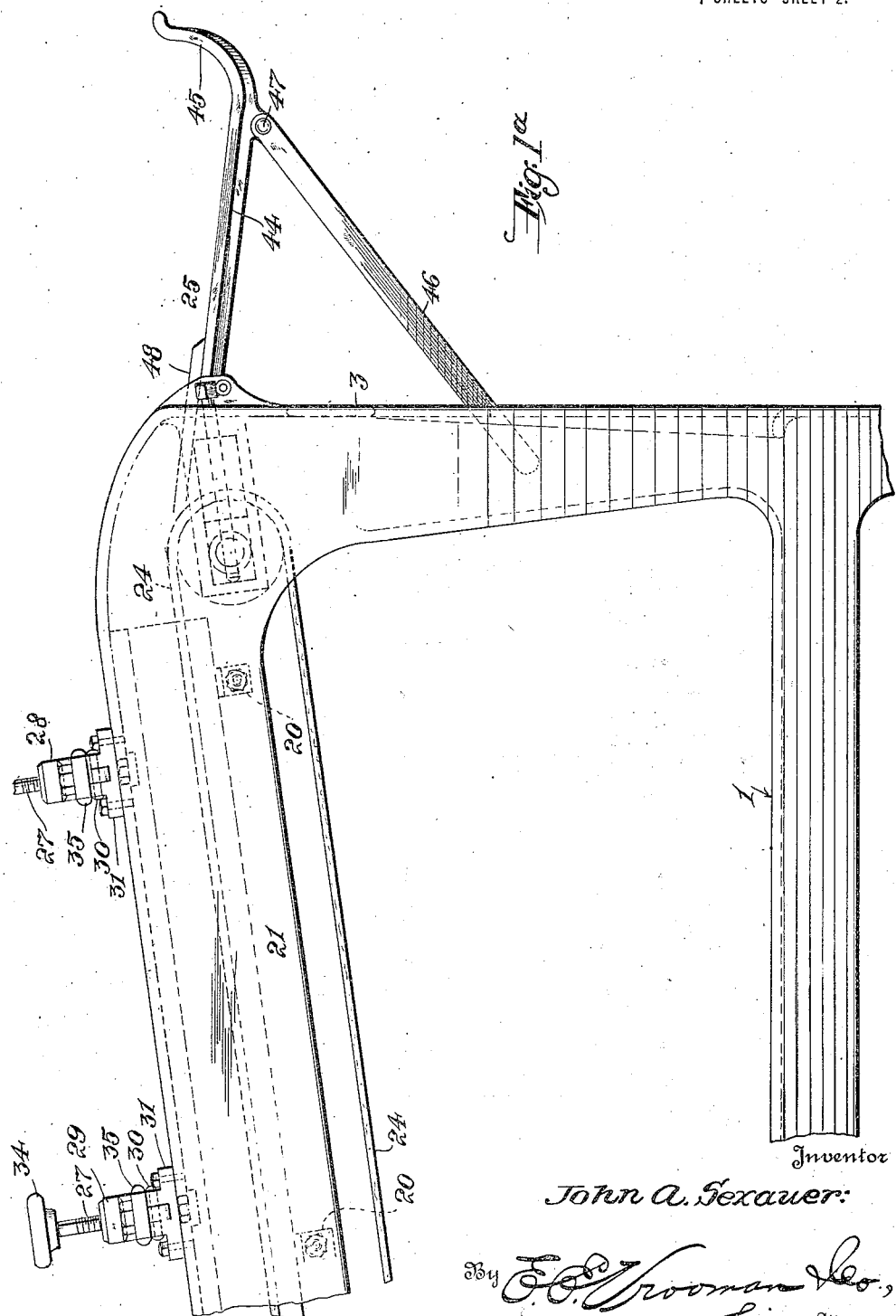

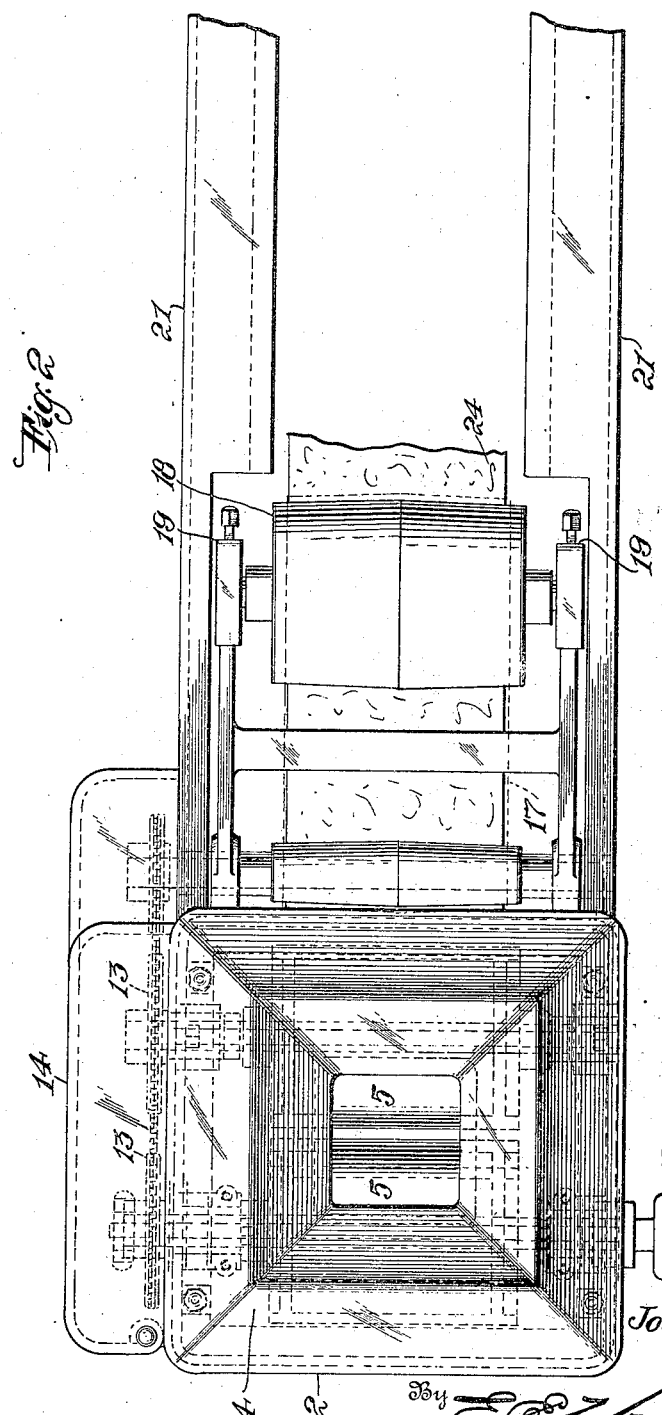

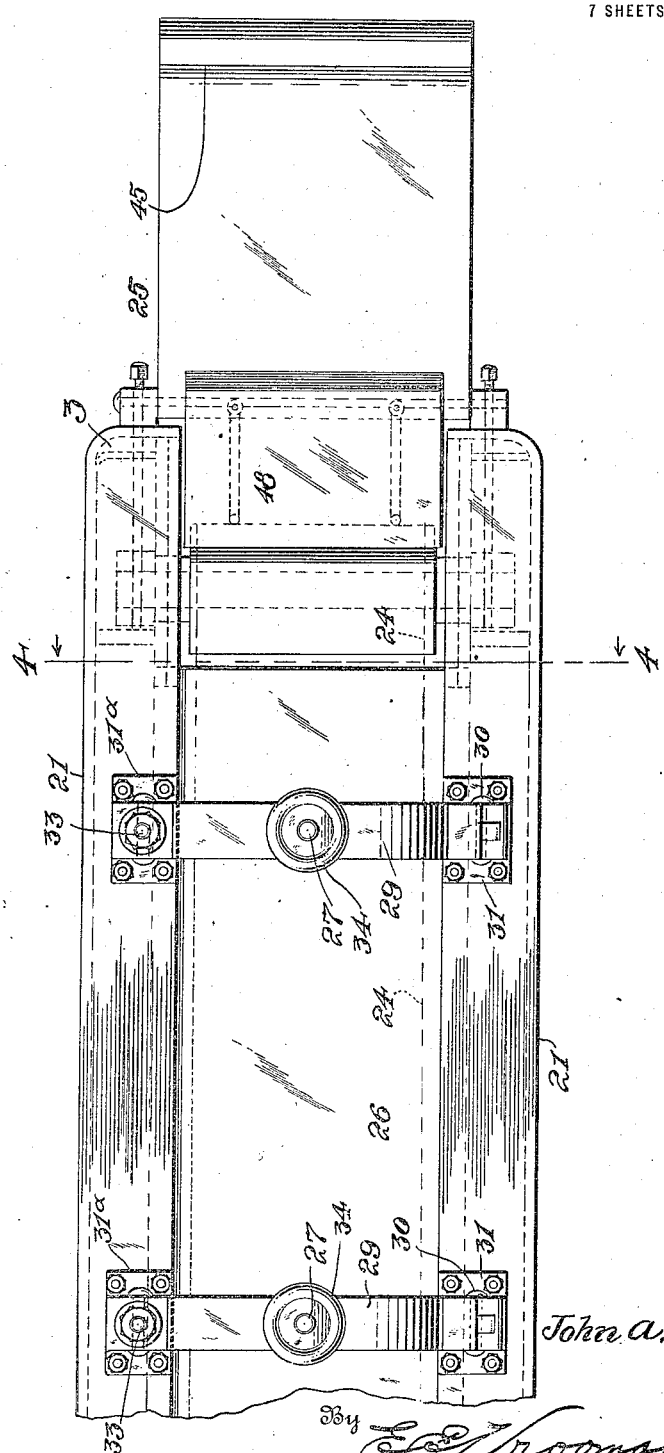

J. A. SEXAUER.
DOUGH MOLDING MACHINE.
APPLICATION FILED FEB. 9, 1921.

1,430,265.

Patented Sept. 26, 1922.
7 SHEETS—SHEET 5.

Inventor
John A. Sexauer,
by
his Attorneys

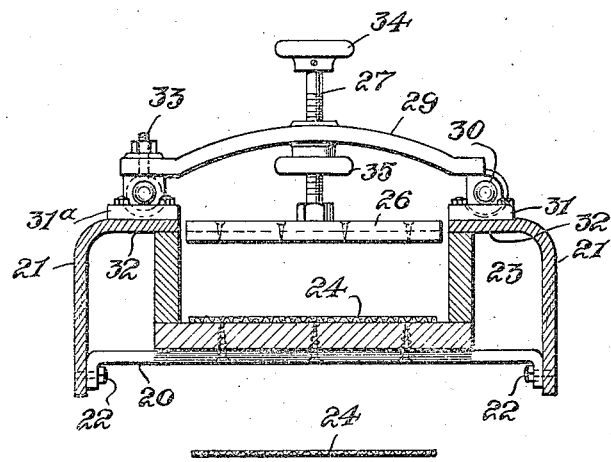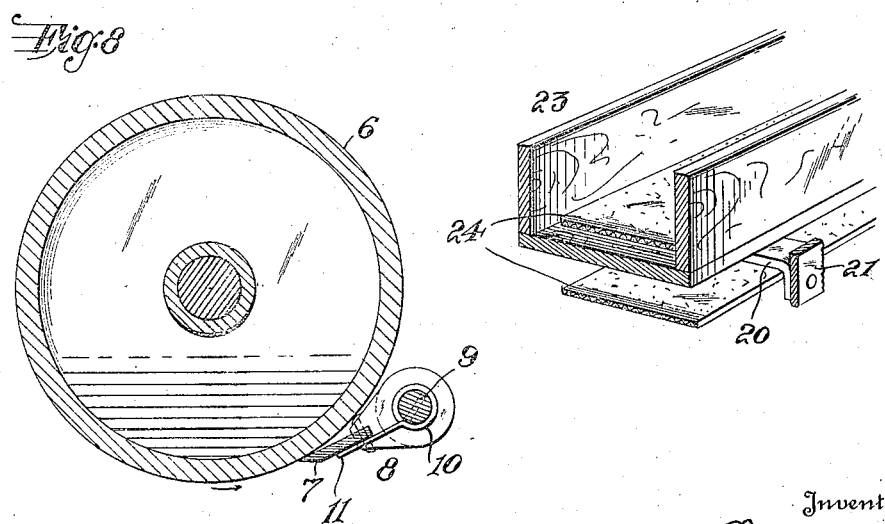

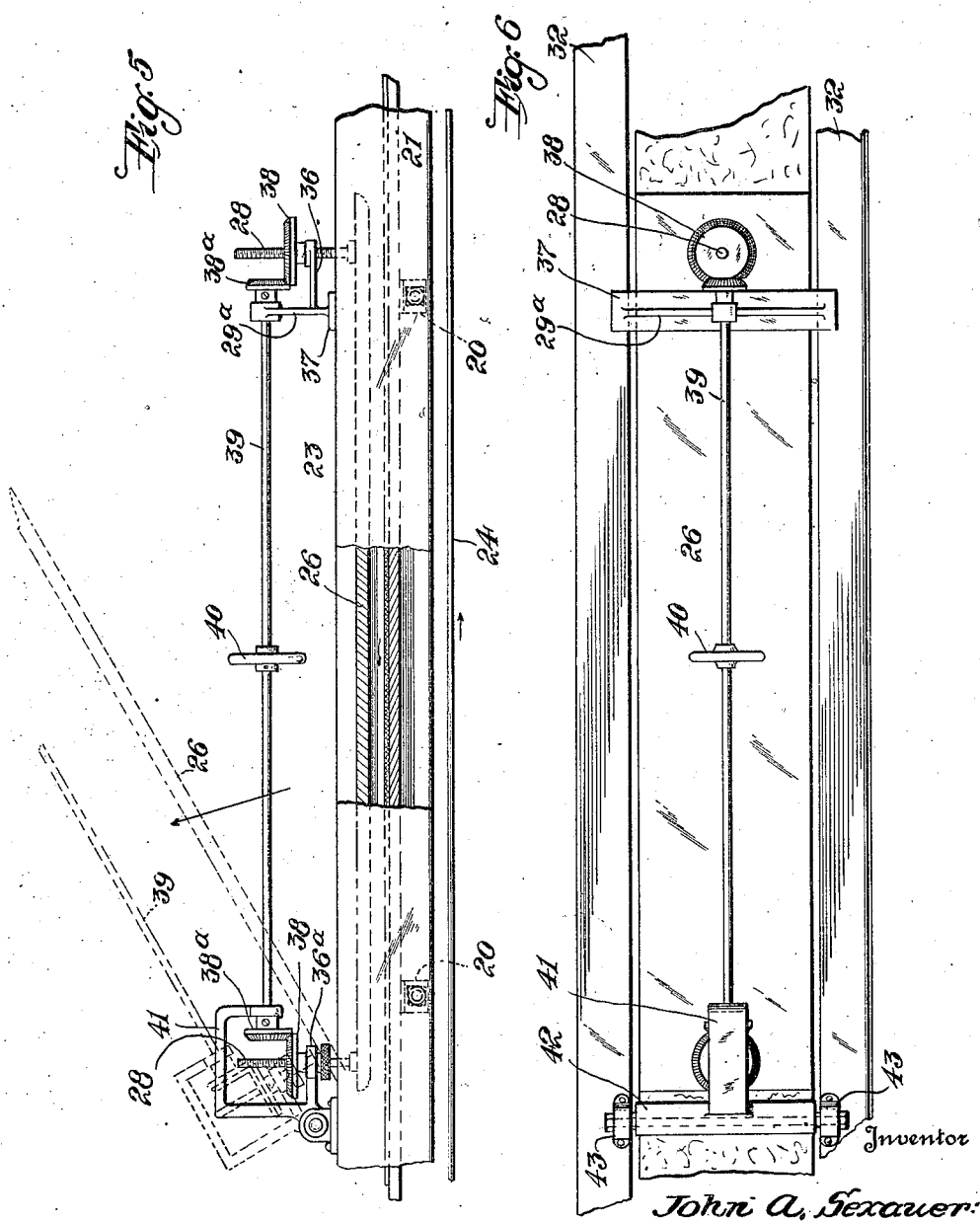

Patented Sept. 26, 1922.

1,430,265

UNITED STATES PATENT OFFICE.

JOHN A. SEXAUER, OF SIDNEY, OHIO.

DOUGH-MOLDING MACHINE.

Application filed February 9, 1921. Serial No. 443,683.

*To all whom it may concern:*

Be it known that I, JOHN A. SEXAUER, a citizen of the United States, residing at Sidney, in the county of Shelby and State of Ohio, have invented certain new and useful Improvements in Dough-Molding Machines, of which the following is a specification, reference being had therein to the accompanying drawings.

This invention relates to a dough molding machine for the making of bread, and the object of the invention is the construction of a simple and efficient machine for the handling and molding of dough into desired shapes prior to placing the shaped dough in an oven.

Another object of the invention is the construction of an efficient device for compressing the dough as it is carried by a conveyor belt, which compressing device is susceptible to easy cleaning.

Another object of the invention is the construction of simple and efficient scraper devices for readily cleaning the rollers that come in contact with the dough.

With these and other objects in view, my invention comprises certain novel combinations, constructions and arrangements of parts as will be hereinafter described, illustrated in the accompanying drawings, and more particularly pointed out in the appended claims.

In the drawings:

Figure 2 is a top plan view of the inlet end of the machine, while Figure 2ª is a top plan view of the outlet or discharge end of the machine.

Figure 4 is a sectional view taken on line 4—4, Figure 2ª, looking in the direction of the arrows.

Figure 5 is a fragmentary view, in side elevation, of a modified form of the machine, showing particularly the compression device, while Figure 6 is a top plan view of the same.

Figure 7 is a fragmentary perspective view of the trough and conveyor belt.

Figure 8 is a transverse sectional view of one of the rollers and the scraper device co-operating therewith.

Figure 1:
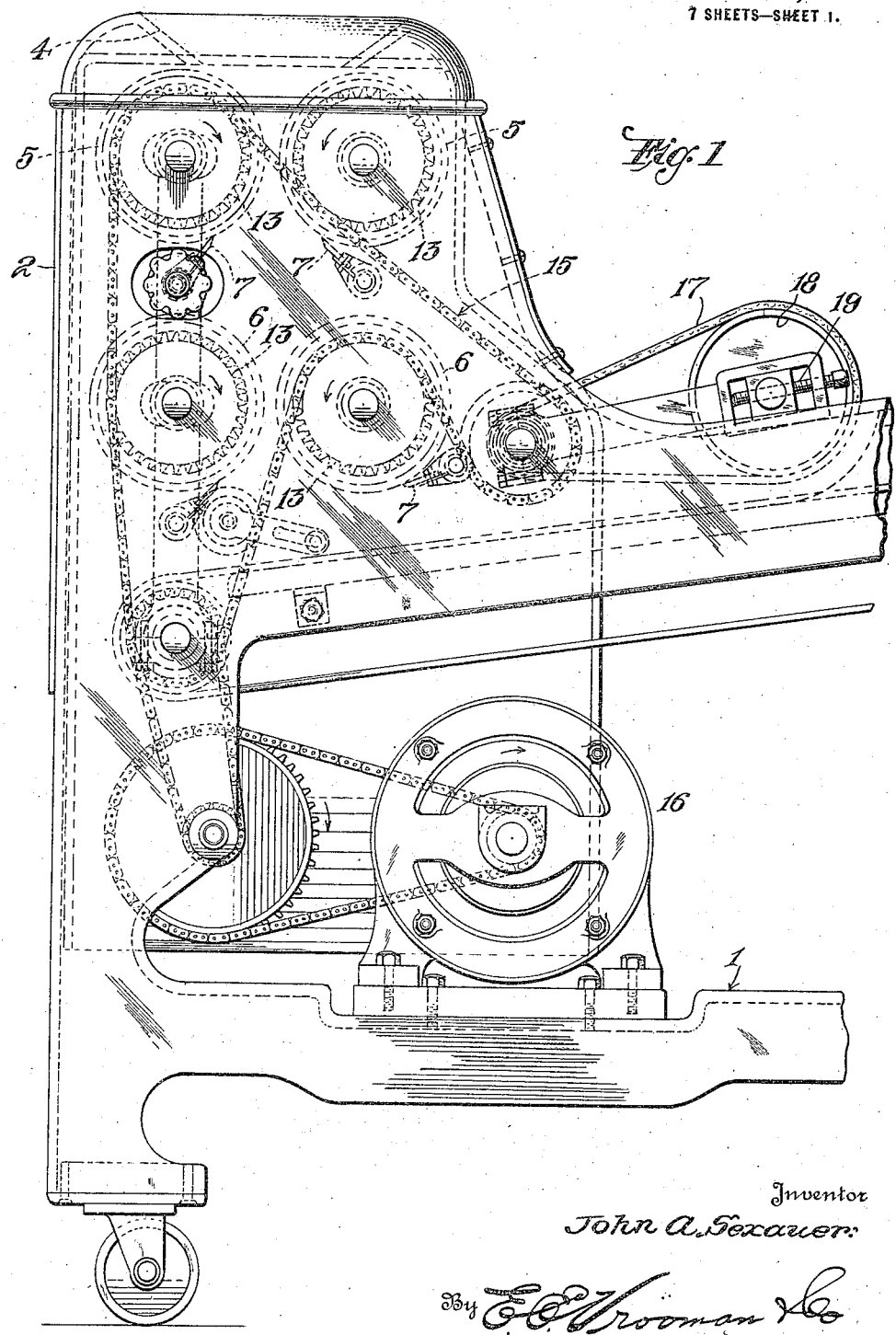
Figure 1 is a view in side elevation of the inlet end of my molding machine, while Figure 1ª is a view in elevation of the outlet or discharge end of the machine.

Referring to the drawings by numerals, 1 designates the frame of the machine, and 2 is the front or inlet end, while 3 is the rear or discharge or outlet end of the machine.

On the inlet end 2 is formed a hopper 4 and below the hopper are pairs of rollers 5 and 6. The rollers in each pair may be adjusted toward or away from each other, simultaneously at the will of the operator, by any ordinary means, for increasing or decreasing the size of the strips or sheets of dough, passing between the rollers from the hopper 4. Each roller of the pairs 5 and 6 may be made of any material, but preferably of aluminum for making the roller light. Against the surface of each roller 6 presses a scraper blade 7 of the scraper device 8. Each scraper device includes a shaft 9 with a coil spring 10 mounted thereon, so that one end 11 (Fig. 3) presses against the back of the blade 7 and holds the blade at all times snugly against the surface of the roller for scraping and cleaning the same. One of the shafts 9 (see Figs. 2 and 3) is extended beyond the side of the inlet end and on the extended end is fastened a hand-wheel 12. By this means the knife carried upon the shaft 9 to which the hand-wheel 12 is connected may be shifted slightly when an occasion requires, and this often happens, since this is near the point of entry of the dough into the device.

Figure 3:
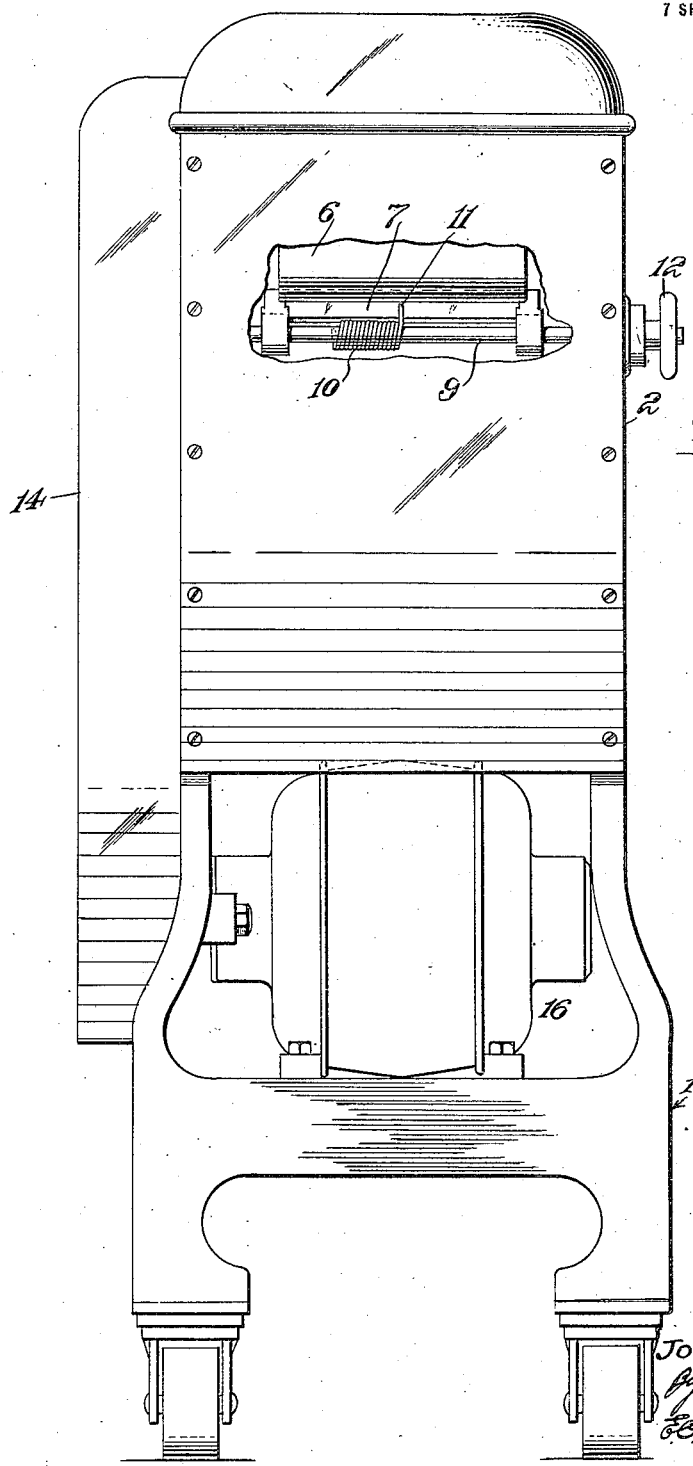
Figure 3 is a view in elevation of the front end of the machine.

Suitable sprockets or gears 13 are fastened to the rollers 5 and 6, these gears being positioned in the gear casing 14 (Figs. 2 and 3). The sprocket chain 15 is connected to the gears or sprockets 13 for driving the same through the medium of the motor 16, fastened upon the frame 1.

A belt 17 passes around the roller 18, Fig. 1, and this belt is adapted to engage the dough as it passes toward the rear or discharge end of the machine. A suitable take-up device 19 is employed for keeping the belt 17 taut.

The compression device includes transverse brackets 20 fastened to the inner faces of the upper sides 21 of the frame 1 by means of bolts 22. Secured upon these brackets 20 is a trough 23, through which passes the upper run of the conveyor belt 24; in other words, the conveyor belt passes directly over the bottom of the trough 23, for carrying the moulded dough or dough-loaves to the catching pan 25 of the machine. A compression board 26 is placed above the conveyor belt 24, within the trough 23, this board being secured to vertical shafts 27, Fig. 4, or threaded shafts 28, Fig. 5. In the embodiment shown in Figs. 1ª and 4, each shaft 27 passes through a yoke frame 29, one end of the frame being hingedly mounted, at 30, upon the plate 31, carried by the inwardly-extending top portion 32 of the side 21. On the top portion 32 of the opposite side, a plate 31ª is positioned, to which is pivotally attached bolt 33, which bolt 33 extends through a portion of the yoke frame 29 and detachably fastens the yoke frame in a fixed position upon the bolt 33 and the plate 31ª. By threading the shafts 27 upon the yoke frames 29, through the medium of the hand-wheels 34, secured to the top of the shafts 27, the compression board 26 can be adjusted with respect to the bottom of the trough 23 for increasing or decreasing the size of the moulded dough passage onto the catching pan 25. A locking member 35 is mounted upon each shaft 27 for locking the shaft 27 against rotation after the compression board has been adjusted; this locking member 35 can be threaded upward or down upon the shaft 27, at the will of the operator.

In the embodiment shown in Figs. 5 and 6, the compression board 26 is supported through the medium of the shaft 28 upon a horizontal extension 36, projecting from the yoke frame 29ª; this yoke frame 29ª has a horizontal base 37 extending across and resting upon the inwardly-extending top portions 32 of the sides 21. This yoke frame can be lifted entirely off the sides of the frame as hereinafter described. A gear 38 is threaded upon shaft 28, and through the medium of gear 38ª, meshing with gear 38, the shaft 28 can be raised or lowered, since the gear 38ª is fastened to the rotatable shaft 39, journaled at one end in the top of the yoke frame 29ª; this shaft 39 is operated by a hand-wheel 40. The other or inner end of the shaft 39 is journaled in a bracket 41. Within the bracket 41, and fastened to the inner end of shaft 39, is a beveled gear 38ª and this gear meshes with another gear 38, which gear 38 is journaled upon a threaded shaft 28, carried by a horizontal extension 36ª of the bracket 41. This bracket 41 is fastened to a transversely-extending shaft 42 (Fig. 6), which shaft is journaled at its ends in brackets 43 that are fastened to the top of the top portions 32. The entire compression device shown in Figs. 5 and 6 can be lifted or swung upon the brackets 43, away from the trough and the conveyor belt, as shown clearly in dotted lines, Fig. 5, so that the compression board 26 can be thoroughly cleaned or scraped at the will of the operator.

The catching pan 25 comprises a platform 44 curved upwardly at its outer end 45, to prevent the moulded dough or dough-loaves from being displaced off the outer end after they have been discharged onto the platform 44. A suitable brace 46 is pivotally connected, at 47, to the bottom of the platform 44, and the lower end of the brace is supported upon the frame 1. A bridge-piece 48 rests at its outer end upon the inner end of the pivotally mounted catching pan, and the inner end of the bridge-piece is positioned close to the conveyor belt so that the moulded dough is discharged onto the bridge-piece 48 and having sufficient momentum, it passes onto the catching pan 25, from which it is taken by the operator and subsequently placed in an oven.

Figure 9:
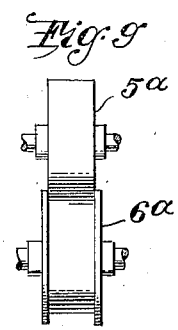
Figure 9 is a fragmentary view of my machine, showing particularly the flanged roller.

In connection with the rollers 5 and 6, Fig. 1, it will be understood, upon referring to Fig. 9, that the roller, or rollers, as desired, may be made flanged—see particularly roller 6ª, Fig. 9. In Fig. 1 the rollers are shown straight, but in the embodiment shown in Fig. 9 roller 6ª is provided with flanges overlapping roller 5ª; the diameter of these rollers may be made to suit conditions, as the operator desires. A large diameter of the roller, or rollers, is very essential to good dough moulding, as a large-diameter roller not only compresses the dough more to release the gas, but also is a help in keeping the dough from sticking to the rollers, and cuts out the use of dusting flour. The reason for putting flanges on the roller, or rollers, as in Fig. 9, is to stretch out the dough in a longer strip and cause it to have more curling surface when passing through the conveyor belt and curling device. The flanged idea, as shown by rollers 5ª and 6ª, Fig. 9, may be used as rollers 5 and 6 in Fig. 1, of the machine, at the will of the constructor.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a dough molding machine, the combination with a frame, of dough-engaging rollers journaled upon said frame, scraper devices bearing against said rollers, one of said scraper devices including a shaft extending through the side of the frame, a hand-wheel on the extended end of said shaft, a blade attached to said shaft, a spring coiled around said shaft and having one end bearing against the outer face of the blade for pressing the blade against the roller, and means under the rollers for conveying dough to one end of the machine.

2. In a dough molding machine, the combination of a frame provided with sides, a trough between said sides, a compression board between the sides and within the trough, a yoke frame resting upon the sides above the trough, said yoke frame provided with a horizontal extension, a threaded shaft fastened at its lower end to the compression board and extending through the horizontal extension, a gear on said threaded shaft, a bracket positioned above the compression board, a pair of brackets fastened to the yoke frame, a shaft extending across the trough and journaled at its ends in said pair of brackets, said first-mentioned bracket fastened to said shaft and having a horizontal extension, a threaded shaft extending through said last-mentioned horizontal extension and connected at its lower end to said compression board, a gear on said last-mentioned shaft, a hand-operated shaft journaled at one end on said yoke frame and at its other end on said first-mentioned bracket, beveled gears attached to the end of said hand-operated shaft and meshing with the gears on said threaded shafts attached to the compression board, and conveying means in the trough under said compression board.

3. In a dough molding machine, the combination of a frame, provided with sides, a trough between said sides, a compression board between said sides and within said trough, a pair of vertical shafts carried by said board, gears threaded upon said shafts, a hand-operated shaft having bevel gears at its ends engaging said first-mentioned gears, and means for supporting said first-mentioned gears and said hand-operated shaft, as and for the purposes set forth.

4. In a dough molding machine, the combination of a frame provided with sides, a trough between said sides, a compression board between said sides and within said trough, a pair of vertical shafts carried by said board, gears threaded upon said shafts, a hand-operated shaft having bevel gears at its ends engaging said first-mentioned gears, a frame connected to said shaft at one end thereof and supporting one of said first-mentioned gears and resting upon said sides, and a bracket pivotally mounted upon said sides and supporting the remaining end of said hand shaft and supporting the remaining first-mentioned gear, as and for the purposes set forth.

In testimony whereof I hereunto affix my signature.

JOHN A. SEXAUER.